(12) United States Patent
Blasco Gonzalez et al.

(10) Patent No.: US 12,651,899 B2
(45) Date of Patent: Jun. 9, 2026

(54) ELECTRICAL ASSEMBLY

(71) Applicant: Lear Corporation, Southfield, MI (US)

(72) Inventors: Lorenzo Blasco Gonzalez, Valls (ES); Ahmed Regragui, Valls (ES); Eric Sole, Valls (ES); Miguel Franco Rius, Valls (ES); Antoni Valls Gadea, Valls (ES)

(73) Assignee: Lear Corporation, Southfield, MI (US)

( * ) Notice: Subject to any disclaimer, the term of this patent is extended or adjusted under 35 U.S.C. 154(b) by 185 days.

(21) Appl. No.: 18/394,188

(22) Filed: Dec. 22, 2023

(65) Prior Publication Data

US 2025/0210975 A1      Jun. 26, 2025

(51) Int. Cl.
  *H02H 9/02*      (2006.01)
(52) U.S. Cl.
  CPC ..................................... *H02H 9/02* (2013.01)
(58) Field of Classification Search
  CPC .. H02H 9/02; H02H 7/20; H02H 9/00; H02H 9/045; H02H 9/047
  USPC ........................................................ 361/57
  See application file for complete search history.

(56) References Cited

U.S. PATENT DOCUMENTS

| | | | |
|---|---|---|---|
| 9,825,625 B2 | 11/2017 | Thalheim | |
| 9,899,999 B2 | 2/2018 | Rannestad | |
| 10,905,423 B2 | 2/2021 | Baber | |
| 11,304,720 B2 | 4/2022 | Kimball | |
| 11,353,517 B1 * | 6/2022 | Dewan .............. | G01R 19/2506 |
| 2013/0207665 A1 * | 8/2013 | Bandyopadhyay .... | G01R 31/50 |
| | | | 324/537 |
| 2017/0222635 A1 * | 8/2017 | Nishimura ............... | H03K 5/01 |

FOREIGN PATENT DOCUMENTS

CN            108387830 A      8/2018

* cited by examiner

*Primary Examiner* — Danny Nguyen
(74) *Attorney, Agent, or Firm* — Reising Ethington P.C.

(57)      ABSTRACT

An electrical assembly includes a controller, a voltage tracker component, a clamp protection circuit, a plurality of analog inputs, and a plurality of pullups. The voltage tracker component may be electrically coupled to a battery. The clamp protection circuit may be electrically coupled between the voltage tracker component and the plurality of analog inputs. The plurality of pullups may be electrically coupled between the plurality of analog inputs and the clamp protection circuit. The clamp protection circuit may control power to the plurality of pullups and may provide a low impedance drain path for a short-circuit current from at least one analog input of the plurality of analog inputs.

20 Claims, 4 Drawing Sheets

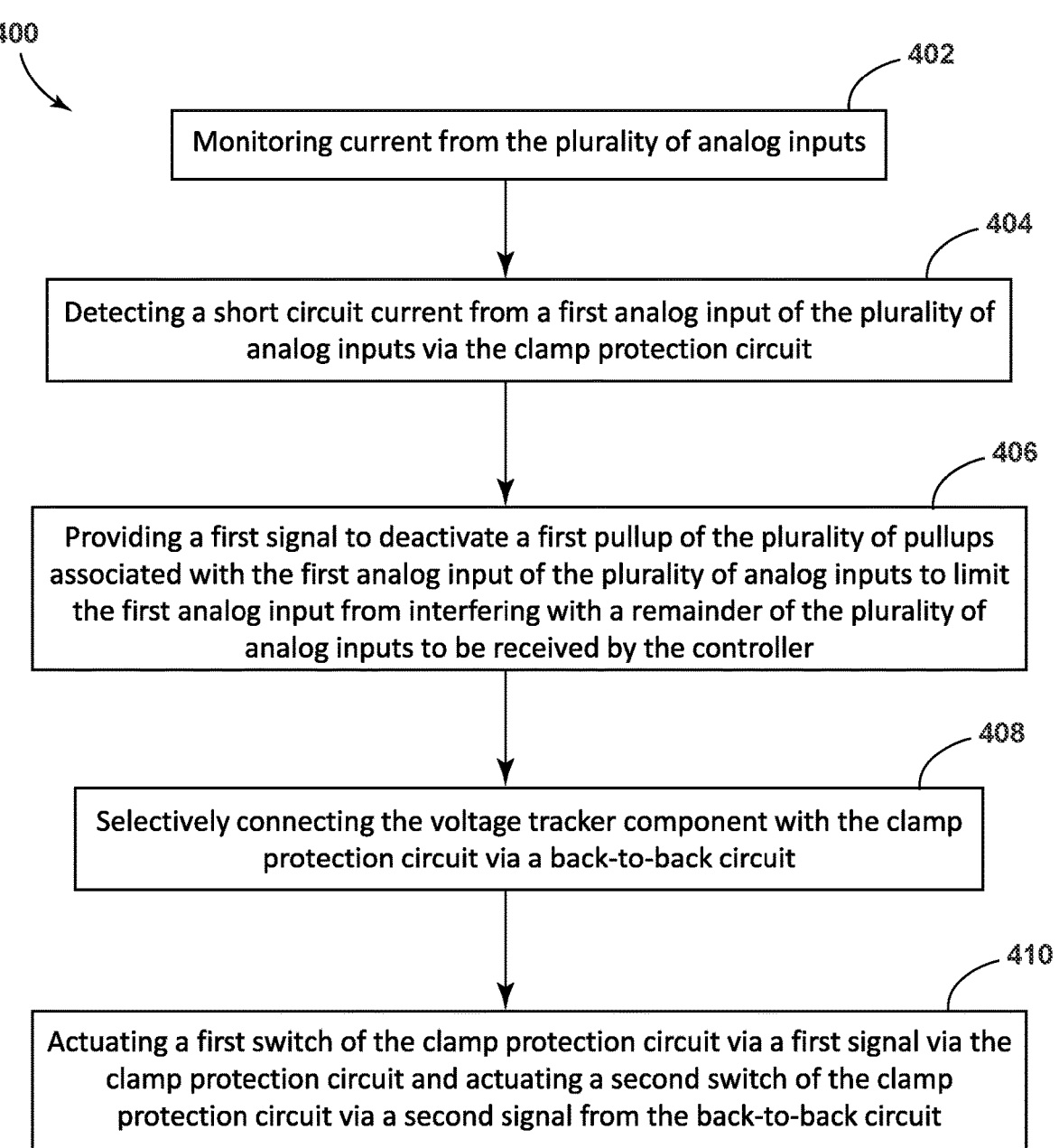

400

402

Monitoring current from the plurality of analog inputs

404

Detecting a short circuit current from a first analog input of the plurality of analog inputs via the clamp protection circuit

406

Providing a first signal to deactivate a first pullup of the plurality of pullups associated with the first analog input of the plurality of analog inputs to limit the first analog input from interfering with a remainder of the plurality of analog inputs to be received by the controller

408

Selectively connecting the voltage tracker component with the clamp protection circuit via a back-to-back circuit

410

Actuating a first switch of the clamp protection circuit via a first signal via the clamp protection circuit and actuating a second switch of the clamp protection circuit via a second signal from the back-to-back circuit

FIG. 4

ELECTRICAL ASSEMBLY

TECHNICAL FIELD

The present disclosure generally relates to electrical assemblies, including assemblies that may include clamp protection circuits and/or voltage tracker components that may, for example, be used in connection with analog inputs.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

FIG. 4 is a flow diagram generally illustrating an embodiment of a method of operating an electrical assembly according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
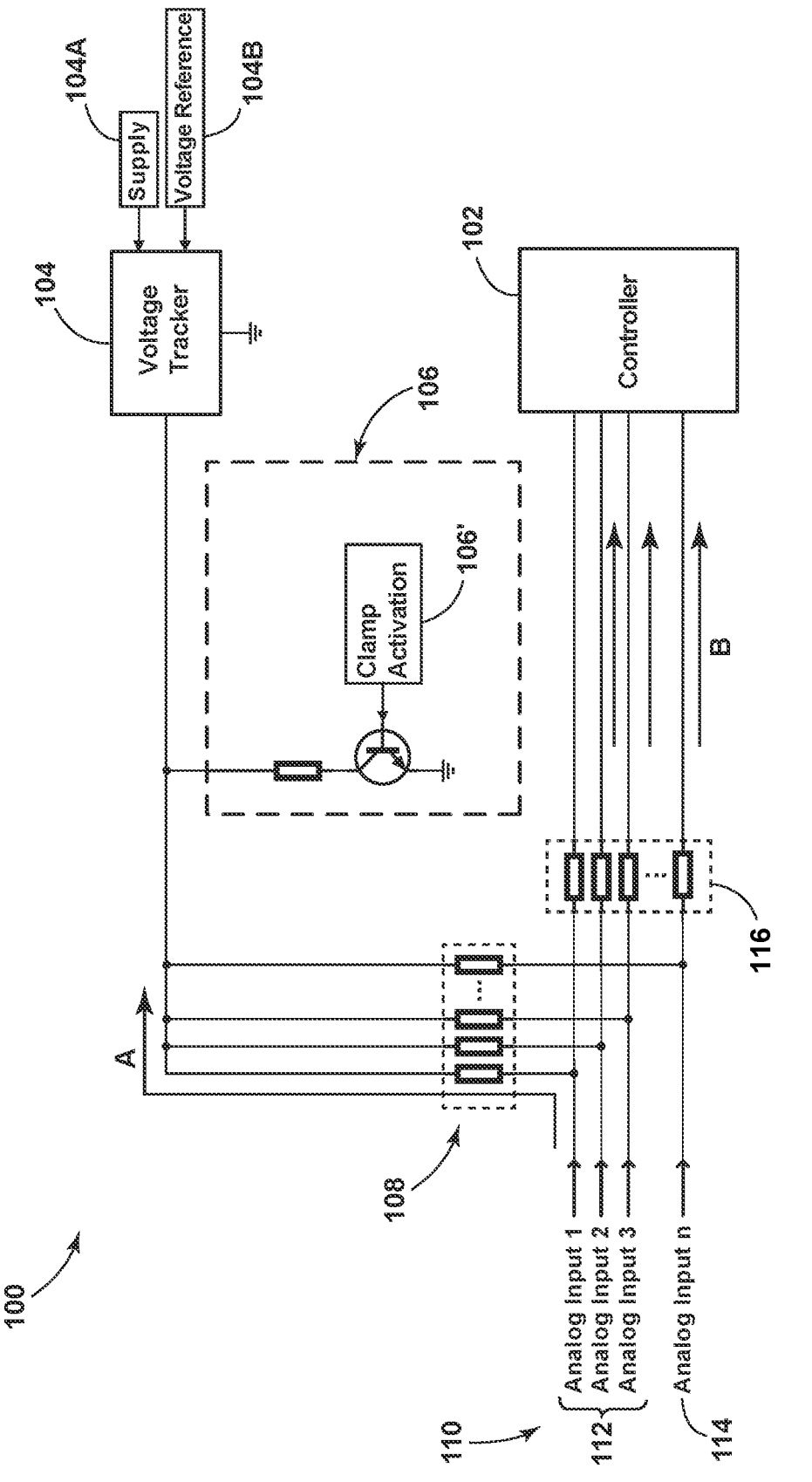
FIG. 1 is a schematic view generally illustrating an embodiment of an electrical assembly according to teachings of the present disclosure.

In embodiments, such as generally illustrated in FIG. 1, an electrical assembly 100 may include a controller 102, a voltage tracker component 104, a clamp protection circuit 106, and/or a plurality of pullups 108. The controller 102 may be electrically coupled to the voltage tracker component 104, the clamp protection circuit 106, and/or the plurality of pullups 108. The controller 102 may be configured to control the clamp protection circuit 106 and/or the plurality of pullups 108. For example and without limitation, the controller 102 may be configured to transmit an activation signal 106' (e.g., a first signal) to the voltage tracker component 104, the clamp protection circuit 106, and/or the plurality of pullups 108. The controller 102 can be configured to control the voltage tracker component 104, the clamp protection circuit 106, and/or the plurality of pullups 108 via the activation signal 106', and/or one or more of a variety of other signals.

With embodiments such as generally illustrated in FIG. 1, the electrical assembly 100 may be electrically coupled with a plurality of inputs 110. For example and without limitation, the plurality of inputs 110 may be one or more of a variety of analog and/or digital inputs. Further, in embodiments, the plurality of inputs 110 may include a first plurality of inputs 112 and/or a second plurality of inputs 114. In some embodiments, the first plurality of inputs 112 and/or the second plurality of inputs 114 may include a single input or multiple inputs. The first plurality of inputs 112 may include analog inputs, and/or the second plurality of inputs 114 may include sensitive analog inputs such as one or more of a variety of Automotive Safety Integrity Level (ASIL) inputs. For example and without limitation, the second plurality of inputs may include ASIL A, ASIL B, ASIL C, ASIL D, and/or Quality Management (QM) inputs (e.g., analog inputs).

In examples, ASIL is a risk classification scheme defined by the International Organization for Standardization (ISO) 26262, Functional Safety for Road Vehicles standard. The ASIL standard is established by performing a risk analysis of a potential hazard by looking at the Severity, Exposure, and Controllability of the vehicle operating scenario. The safety goal for that hazard in turn carries the ASIL requirements. Further, four ASILs are identified by the standard, ASIL A, ASIL B, ASIL C, ASIL D, and a QM level. ASIL D represents the highest degree of automotive hazard and thus, the highest degree of rigor to be applied to assure safety requirements are met while ASIL A represents the lowest degree of hazard. ASIL B and ASIL C provide a range of intermediate degrees of hazard and degrees of assurance required. In examples, ASIL B may include headlight and brake light operations, while ASIL C may include braking of rear wheels and/or cruise control. QM represents applications with no automotive hazards and, therefore, no safety requirements to manage under the ISO 26262 safety processes.

In embodiments, the electrical assembly 100 may be designed to conform to meet the requirements of ASIL A, B, C, or D. Further, for example and without limitation, it may be desirable to design the electrical assembly 100 for at least ASIL B (e.g., including ASIL A and/or QM). The electrical assembly 100 may be configured to limit and/or prevent interference between the plurality of inputs 110. Interference may include/involve any variety of signal, electrical field, voltage, current, and/or operating condition where a faulty input of the plurality of inputs 110 may affect (altering/compromising) the remainder the plurality of inputs 110. ASIL A, B, C, and/or D inputs may be sensitive to interference, so it may be desirable to isolate each input of the plurality of inputs 110 to meet the various safety requirements of the associated ASIL level.

With embodiments, such as generally illustrated in FIG. 1, the electrical assembly 100 may isolate the plurality of inputs 110 from interference via the clamp protection circuit 106. The plurality of pullups 108 of the electrical assembly 100 may be electrically coupled between the associated input of the plurality of inputs 110, the clamp protection circuit 106, and the controller 102. The plurality of pullups 108 may ensure that the voltage level received by the controller (for an associated input of the plurality of inputs 110) is pulled up to a logical high state. Further, the plurality of pullups 108 can be selected/designed to set one or more unconnected pins of the controller 102 to a known state to limit/prevent false signals or erratic behavior in the electrical assembly 100 due to floating inputs or signal interference. The plurality of pullups 108 may provide a consistent and/or stable voltage level for the controller 102 thereby protecting the controller 102 against unpredictable and unreliable behavior of the plurality of inputs 110. The plurality of pullups 108 may be coupled between the plurality of inputs 110 and the clamp protection circuit 106.

In examples, the electrical assembly 100 may include one or more high current switches 116 that may be configured to substantially limit and/or prevent high input currents from being transmitted to the controller 102. Further, the one or more high current switches 116 may be configured to prevent damage (e.g., internal) from occurring to the controller 102 due to high current on the input. The high current switches 116 may be configured to operate collectively and/or independently.

In embodiments, the controller 102 of the electrical assembly 100 may be a microcontroller unit (MCU) which can be a compact, integrated semiconductor device featuring a central processing unit (CPU), memory, and various input/ output peripherals. The controller 102 may be configured to execute specific tasks and/or perform various control functions within electronic systems and embedded applications. The controller 102 may be configured to transmit, receive, and/or generate one or more of a variety of signals. The controller 102 may include one or more of a variety of components for independent operation, such as programmable memory for storing instructions, a CPU to process instructions, and/or configurable input/output interfaces enabling communication with connected devices. The controller 102 may include the capability to manage diverse operations, interact with external sensors and devices, process data, and/or execute programmed instructions. The controller 102 can be programmed and/or configured for any variety of tasks, for example and without limitation, operations associated with ASIL B inputs.

With embodiments, such as shown in FIG. 1, the voltage tracker component 104 may be electrically coupled to the clamp protection circuit 106 and/or the plurality of pullups 108. The voltage tracker component 104 (e.g., with supply voltage 104A and reference voltage 104B) may be configured to supply and/or maintain a stable and consistent output voltage that substantially mimics variations in the input or reference voltage. The voltage tacker component 104 may comprise one or more operational amplifiers, transistors, and/or integrated circuits that compare an input or reference voltage with the actual output voltage. If the output voltage differs from the reference or desired voltage, the voltage tracker component 104 may correct by adjusting the output voltage. The voltage tracker component 104 may provide stabilization of the output voltage by minimizing variations due to fluctuations in the input or reference voltage, temperature changes, and/or load variations. The voltage tracker component 104 may be configured to compare a supply voltage 104A to a reference voltage 104B in adjusting the output voltage.

In embodiments, such as generally illustrated in FIG. 1, the clamp protection circuit 106 may be electrically coupled between the voltage tracker component 104 and the plurality of pullups 108. The clamp protection circuit 106 may be configured to isolate a faulty input (e.g., a short circuit) of the plurality of inputs 110 from affecting the remainder of the plurality of inputs 110, and/or from affecting the controller 102 (e.g., shorting the controller 102). For example, a first input of the plurality of inputs 110 can experience a short circuit condition to the shared supply, as shown by fault arrow 'A' (e.g., the voltage tracker component 104). It may be desirable to limit and/or prevent the short circuit condition of the first input from affecting the integrity of the remaining inputs of the plurality of inputs 110, as shown by arrow 'B' (e.g., such as to meet ASIL B level requirements).

Further, with embodiments, the clamp protection circuit 106 may be configured as a common active clamping circuit in the shared supply for the plurality of pullups 108. In this manner, the clamp protection circuit 106 may provide a low impedance path draining short circuit current of the shared supply to ground while maintaining the voltage in the plurality of pullups 108. The clamp protection circuit 106 may be activated and/or controlled via an activation signal 106' (e.g., a clamp activation signal) which can be transmitted from a one or more of a variety of sources and in one or more of a variety of manners. For example and without limitation, the controller 102 can be configured to generate and/or transmit the activation signal 106' to activate one or more switches of the clamp protection circuit 106. The one or more switches can comprise one or more of a variety of switching mechanisms, such as a diode, capacitor, transistor, field effect transistor (FET), metal oxide field effect transistor (MOSFET), such a n-channel or p-channel MOSFET, a bipolar junction transistor (BJT), and/or a smart FET, among others. Further, the one or more switches may reroute a short circuit current from an input of the plurality of inputs 110 to a drain path to ground instead of reaching/effecting the voltage tracker component 104.

Figure 2:
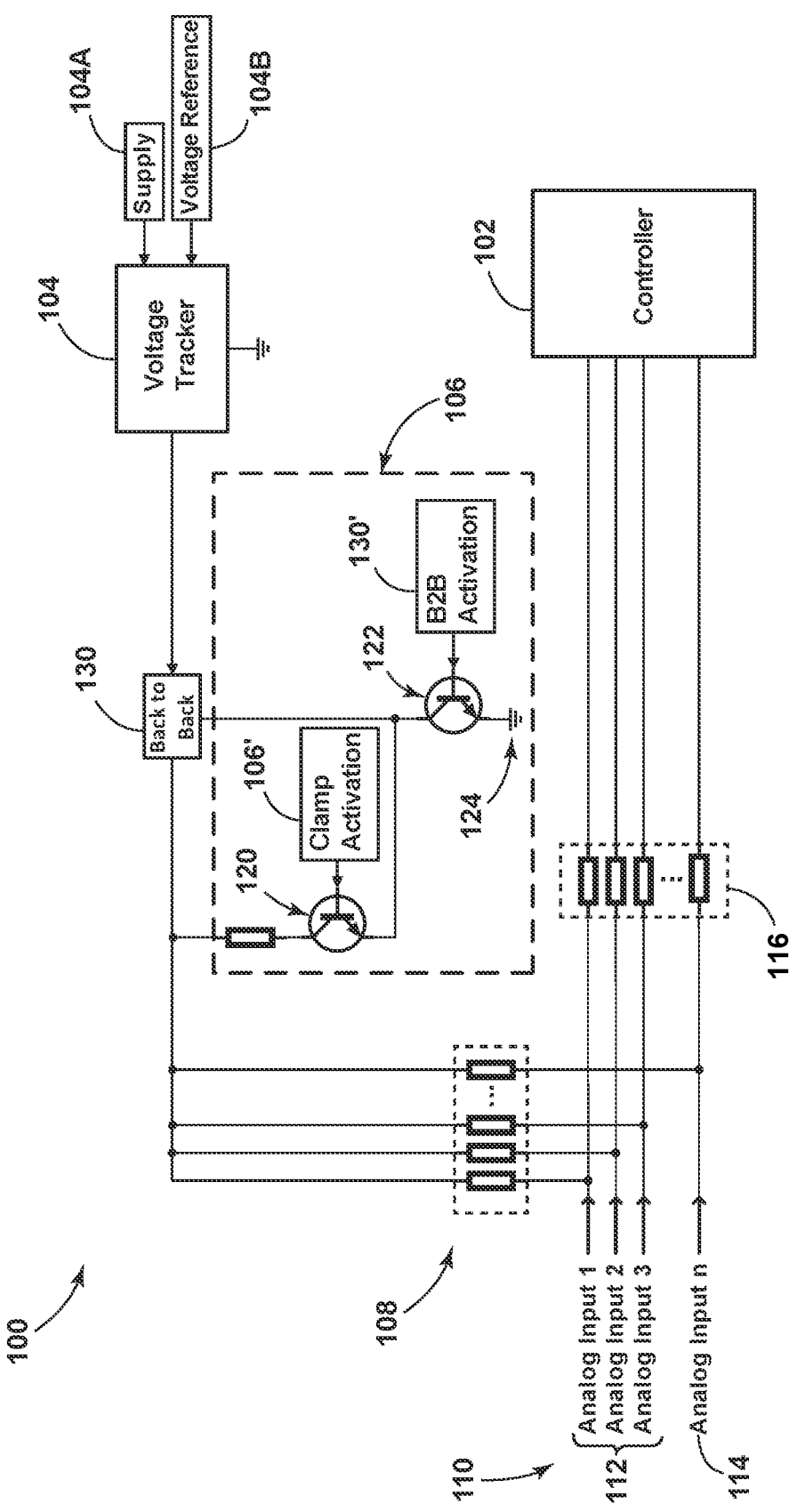
FIG. 2 is a schematic view generally illustrating an embodiment of an electrical assembly according to teachings of the present disclosure.

In embodiments, such as generally illustrated in FIGS. 1 and 2, the plurality of inputs 110 may be analog inputs, and further, may be configured as wake-up sources. For example and without limitation, wake-up sources may include the ability to initiate and/or trigger the activation or waking up of the electrical assembly 100 (e.g., the controller 102) from a low-power/sleep state to an active, operational mode. The wake-up sources may be configured to detect certain external events, signals, and/or changes in the operating environment, such as short circuit conditions. The electrical assembly 100 may be activated by receiving activation signal 106' to awaken from the low-power state to a fully operational state.

Additionally or alternatively, the plurality of inputs 110 may include a first plurality of inputs 112 and/or a second plurality of inputs 114. For example and without limitation, the first plurality of inputs 112 may include any variety and/or any quantity of input (e.g., analog, digital, ASIL, non-ASIL, etc.), and/or the second plurality of inputs 114 may include at least one analog ASIL B level input. With examples, the electrical assembly 100 may limit interferences deriving from the first plurality of inputs 112 (e.g., as shown by arrow 'A') from effecting the second plurality of inputs 114 (e.g., as shown by arrow 'B') via the clamp protection circuit 106.

As can be seen from FIG. 2, the clamp protection circuit 106 may include a first switch 120 and/or a second switch 122. The output of the first switch 120 may be directly coupled to the input of the second switch 122. Further, the output of the second switch 122 may be coupled directly to ground 124. The clamp protection circuit 106 may include any number of switches to facilitate redirecting a short circuit condition (e.g., originating from a faulty input of the plurality of inputs) from reaching the voltage tracker component 104 and/or the remainder of the plurality of inputs 110. In such a manner, the clamp protection circuit 106 may limit the short circuit condition from affecting the integrity of the remainder of the plurality of inputs 110 (e.g., as may be involved with a variety of ASIL inputs). The first switch 120 may be electrically coupled between the plurality of pullups 108, the second switch 122, and/or a back-to-back circuit 130.

With embodiments, such as generally illustrated in FIG. 2, the back-to-back circuit 130 may be configured to provide safety in operating the electrical assembly 100. Further, the back-to-back circuit 130 (e.g., the controller 102) may be configured to generate a control signal 130' to activate the second switch 122. The back-to-back circuit 130 may facilitate selectively connecting the voltage tracker component 104 with the plurality of pullups 108 such that the voltage tracker component 104 may be in an enabled state. The voltage tracker component 104 may be in a substantially always enabled state due to the back-to-back circuit 130 switching the pullups 108. Allowing the voltage tracker component 104 to be operated in an enabled state can reduce cost, consumption of power, and/or materials in designing ASIL B systems.

Further, the first switch 120 may be configured to actuate (e.g., close) in response to receiving the activation signal 106' (e.g., a first signal). The second switch 122 may be configured to actuate (e.g., close) in response to receiving the control signal 130' (e.g., a second signal) via the back-to-back circuit 130. The second switch 122 may be electrically coupled to ground 124, such as to provide a low impedance path (e.g., in a closed state) for draining short circuit current from the shared supply to the ground 124 while voltages are maintained in the plurality of pullups 108 (e.g., while the voltage tracker component 104 is in an enabled state).

Figure 3:
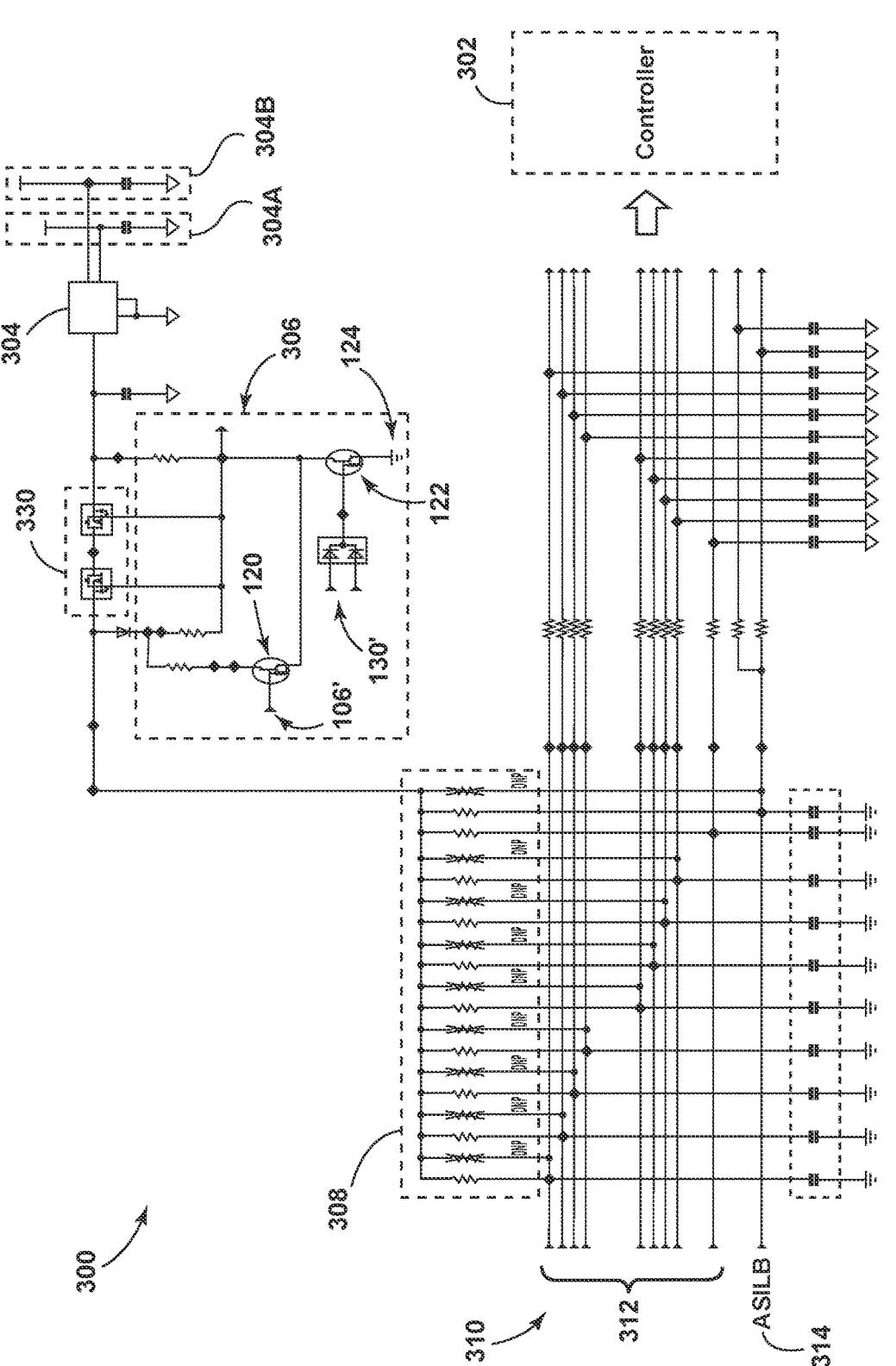
FIG. 3 is a schematic view generally illustrating an embodiment of an electrical assembly according to teachings of the present disclosure.

In embodiments, such as generally illustrated in FIG. 3, an electrical assembly 300 may include a controller 302, a voltage tracker component 304, a clamp protection circuit 306, a plurality of pullups 308, and a plurality of analog inputs 310. A back-to-back circuit 330 may be electrically coupled between the voltage tracker component 304 (e.g., with supply voltage 304A and reference voltage 304B) and the plurality of analog inputs 310 (e.g., and the plurality of pullups 308). Further, the back-to-back circuit 330 may be electrically coupled between the clamp protection circuit 306 and the voltage tracker component 304, in such a manner that the back-to-back circuit 330 can reroute short circuit current before reaching the voltage tracker component 304.

With examples, the back-to-back circuit 330 may include a first switching element 330A and/or a second switching element 330B. The first switching element 330A and the second switching element 330B may facilitate disconnection of the voltage tracker component 304 from the plurality of analog inputs 310. The first switching element 330A may be electrically coupled with the first switch 120 and/or the second switch 122 of the clamp protection circuit 306. Additionally, the second switching element 330B may be electrically coupled with the first switch 120, the second switch 122, and/or the voltage tracker component 304. In further embodiments, the first switch 120 may be directly coupled with the second switch 122 such as to route current received from the plurality of analog inputs 310, through the first switch 120 (e.g., upon receiving the activation signal 106'), the second switch 122 (e.g., upon receiving the control signal 130'), and to the ground 124 (e.g., for draining current).

In embodiments, the back-to-back circuit 330 may be operable while the second switch 122 is on (e.g., in an engaged position/state). Similarly, the back-to-back circuit 330 may not be operable while the second switch 122 is off (e.g., in a non-engaged position/state). When the second switch 122 is off, the back-to-back circuit 330 may not facilitate (e.g., allow) output current to flow out and/or may not facilitate (e.g., allow) input currents to flow into the voltage tracker component 304. Further, the clamp protection circuit 306 may be active (e.g., awake) when second switch 122 is on (e.g., such as to control the plurality of pullups 308).

With embodiments, such as generally illustrated in FIG. 4, a method 400 of operating an electrical assembly 300 may include coupling a clamp protection circuit 306 between a voltage tracker component 304 and/or a plurality of analog inputs 310. Further, the method 400 may include coupling a plurality of pullups 308 between the plurality of analog inputs 310 and the clamp protection circuit 306. In some configurations, the method 400 of operating the electrical assembly 300 may include monitoring current from the plurality of analog inputs 310 (block 402). For example and without limitation, the controller 302 and/or the clamp protection circuit 306 may be configured to facilitate monitoring of the plurality of analog inputs 310.

In embodiments, the method 400 may include detecting a short circuit current from a first analog input of the plurality of analog inputs 310 via the clamp protection circuit 306 (block 404). The clamp protection circuit 306 may be configured to isolate the impact of short circuit currents (deriving from the first analog input) from effecting a remainder of the plurality of analog inputs 310 such that faulty signals are not transmitted to the controller 302, thus preserving the ASIL B integrity of operation. Further, the clamp protection circuit 306 (e.g., the controller 302) may, in response to detecting a short circuit current, provide a first signal to deactivate a first pullup of the plurality of pullups 308 associated with the first analog input of the plurality of analog inputs 310 to limit the first analog input from shorting the remainder of the analog inputs 310 (block 406).

With embodiments, the method 400 may include selectively connecting the voltage tracker component 304 with the clamp protection circuit 306 via a back-to-back circuit 330 (block 408). Further, the back-to-back circuit 330 may be coupled between the clamp protection circuit 306 and the voltage tracker component 304. In examples, the method 400 may include selectively connecting the voltage tracker component 304 with the plurality of analog inputs 310 while the voltage tracker component 304 is enabled (e.g., without disabling and/or enabling the voltage tracker component 304).

In embodiments, the method 400 may include actuating a first switch 120 of the clamp protection circuit 306 via a first signal to selectively connect the plurality of analog inputs 310 with the plurality of pullups 308 (block 410). Additionally, the method 400 may include actuating a second switch in response to receiving a second signal via a back-to-back circuit 330 to drain the short circuit current (also block 410).

In examples, a controller (e.g., the controller 102) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

The disclosure includes, without limitation, the following embodiments:

1. An electrical assembly, comprising: a controller; a voltage tracker component electrically coupled to a battery; a clamp protection circuit electrically coupled between the voltage tracker component and a plurality of analog inputs; and a plurality of pullups electrically coupled between the plurality of analog inputs and the clamp protection circuit; and wherein the clamp protection circuit controls power to the plurality of pullups and provides a low impedance drain path for a short-circuit current from at least one analog input of the plurality of analog inputs.

2. The electrical assembly of embodiment 1, wherein the controller activates and deactivates the plurality of pullups while the voltage tracker component is enabled to limit the short-circuit current from affecting a remainder of the plurality of analog inputs.

3. The electrical assembly according to any of the preceding embodiments, wherein the controller is configured to receive input from the plurality of analog inputs when the coupled pullups of the plurality of pullups are activated via the controller.

4. The electrical assembly according to any of the preceding embodiments, wherein a short circuit current of a first analog input of the plurality of analog inputs is isolated from a remainder of the plurality of analog inputs by deactivating a first pullup associated with the first analog input.

5. The electrical assembly according to any of the preceding embodiments, wherein a remainder of the plurality of pullups are activated.

6. The electrical assembly according to any of the preceding embodiments, wherein the clamp protection circuit includes at least one switch operable to route the short-circuit current to a ground for draining.

7. The electrical assembly according to any of the preceding embodiments, wherein at least one of the plurality of analog inputs is an Automotive Safety Integrity Level (ASIL) B input.

8. The electrical assembly according to any of the preceding embodiments, wherein the plurality of analog inputs operate as wake-up sources for the controller.

9. The electrical assembly according to any of the preceding embodiments, further comprising a back-to-back circuit electrically coupled between the clamp protection circuit and the voltage tracker component, wherein the back-to-back circuit is electrically coupled such that the back-to-back circuit selectively connects the voltage tracker component from the plurality of analog inputs while the voltage tracker component is active.

10. The electrical assembly according to any of the preceding embodiments, wherein the clamp protection circuit includes a first switch coupled to at least one of the plurality of pullups and configured to actively clamp in response to receiving a first signal.

11. The electrical assembly according to any of the preceding embodiments, wherein the clamp protection circuit includes a second switch configured to actively clamp in response to receiving a second signal from the back-to-back circuit, and the first switch is electrically coupled to the second switch.

12. The electrical assembly according to any of the preceding embodiments, wherein the second switch is electrically coupled to a ground to provide the low impedance drain path.

13. A method of operating an electrical assembly comprising a controller, a clamp protection circuit coupled between a voltage tracker component and a plurality of analog inputs, and a plurality of pullups coupled between the plurality of analog inputs and the clamp protection circuit, the method comprising: monitoring current from the plurality of analog inputs; and in response to detecting a short circuit current from a first analog input of the plurality of analog inputs via the clamp protection circuit: providing a first signal to deactivate a first pullup of the plurality of pullups associated with the first analog input of the plurality of analog inputs to limit the first analog input from interfering with a remainder of the plurality of analog inputs to be received by the controller.

14. The method according to any of the preceding embodiments, further comprising: selectively connecting the voltage tracker component with the clamp protection circuit via a back-to-back circuit; wherein the back-to-back circuit is coupled between the clamp protection circuit and the voltage tracker component.

15. The method according to any of the preceding embodiments, further comprising: generating the first signal via the controller.

16. The method according to any of the preceding embodiments, further comprising: generating the first signal via the clamp protection circuit.

17. The method according to any of the preceding embodiments, further comprising: selectively connecting the voltage tracker component with the plurality of analog inputs via a back-to-back circuit while the voltage tracker component is enabled.

18. The method according to any of the preceding embodiments, further comprising: actuating a first switch of the clamp protection circuit via the first signal to selectively connect the plurality of analog inputs with the plurality of pullups; actuating a second switch in response to receiving a signal via a back-to-back circuit to drain the short circuit current.

19. The method according to any of the preceding embodiments, further comprising: operating the controller, the voltage tracker component, the clamp protection circuit, and the plurality of pullups consistent with ASIL B.

20. A method of assembling an electrical assembly including a controller, a clamp protection circuit coupled between a voltage tracker component and a plurality of analog inputs, and a plurality of pullups coupled between the plurality of analog inputs and the clamp protection circuit, the method comprising: connecting a back-to-back circuit between the voltage tracker component and the clamp protection circuit to selectively connect the voltage tracker component; connecting a first switch of the clamp protection circuit to a second switch of the clamp protection circuit; connecting the input of the first switch to the plurality of analog inputs; connecting an input of the second switch to an output of the first switch; and connecting an output of the second switch to a ground source; wherein the clamp protection circuit controls the first switch to isolate the plurality of pullups from the controller and the back-to-back circuit controls the second switch to isolate the voltage tracker component from the clamp protection circuit.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a controller, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical assembly, comprising:
a controller;
a clamp protection circuit electrically coupled between a battery and a plurality of analog inputs; and
a plurality of pullups electrically coupled between the plurality of analog inputs and the clamp protection circuit,
wherein the clamp protection circuit controls power to the plurality of pullups and the clamp protection circuit provides a low impedance drain path for a short-circuit current from at least one analog input of the plurality of analog inputs to drain the short-circuit current to a ground.

2. The electrical assembly of claim 1, further comprises a voltage tracker component coupled to the battery, wherein the controller activates and deactivates the plurality of pullups while the voltage tracker component is enabled to limit the short-circuit current from affecting a remainder of the plurality of analog inputs.

3. The electrical assembly of claim 1, wherein the controller is configured to receive input from the plurality of analog inputs when the plurality of pullups electrically coupled between the plurality of analog inputs and the clamp protection circuit are activated via the controller.

4. The electrical assembly of claim 1, wherein a short circuit current of a first analog input of the plurality of analog inputs is isolated from a remainder of the plurality of analog inputs by deactivating a first pullup associated with the first analog input.

5. The electrical assembly of claim 4, wherein a remainder of the plurality of pullups are activated.

6. The electrical assembly of claim 5, wherein the clamp protection circuit includes at least one switch operable to route the short-circuit current to the ground for draining.

7. The electrical assembly of claim 1, wherein at least one of the plurality of analog inputs is an Automotive Safety Integrity Level (ASIL) B input.

8. The electrical assembly of claim 1, wherein the plurality of analog inputs operate as wake-up sources for the controller.

9. The electrical assembly of claim 2, further comprising a back-to-back circuit electrically coupled between the clamp protection circuit and the voltage tracker component, wherein the back-to-back circuit is electrically coupled such that the back-to-back circuit selectively connects the voltage tracker component from the plurality of analog inputs while the voltage tracker component is active.

10. The electrical assembly of claim 9, wherein the clamp protection circuit includes a first switch coupled to at least one of the plurality of pullups and configured to actively clamp in response to receiving a first signal.

11. The electrical assembly of claim 10, wherein the clamp protection circuit includes a second switch configured to actively clamp in response to receiving a second signal from the back-to-back circuit, and the first switch is electrically coupled to the second switch.

12. The electrical assembly of claim 11, wherein the second switch is electrically coupled to the ground to provide the low impedance drain path.

13. A method of operating an electrical assembly comprising a controller, a clamp protection circuit coupled to a plurality of analog inputs, and a plurality of pullups coupled between the plurality of analog inputs and the clamp protection circuit, the method comprising:

monitoring current from the plurality of analog inputs; and in response to detecting a short circuit current from a first analog input of the plurality of analog inputs via the clamp protection circuit, providing a first signal to deactivate a first pullup of the plurality of pullups associated with the first analog input of the plurality of analog inputs to limit the first analog input from interfering with a remainder of the plurality of analog inputs to be received by the controller.

14. The method of claim 13, further comprising:

selectively connecting a voltage tracker component with the clamp protection circuit via a back-to-back circuit, wherein the back-to-back circuit is coupled between the clamp protection circuit and the voltage tracker component.

15. The method of claim 13, further comprising: generating the first signal via the controller.

16. The method of claim 13, further comprising: generating the first signal via the clamp protection circuit.

17. The method of claim 14, further comprising:

selectively connecting the voltage tracker component with the plurality of analog inputs via the back-to-back circuit while the voltage tracker component is enabled.

18. The method of claim 13, further comprising:

actuating a first switch of the clamp protection circuit via the first signal to selectively connect the plurality of analog inputs with the plurality of pullups;

actuating a second switch in response to receiving a signal via a back-to-back circuit to drain the short circuit current.

19. The method of claim 14, further comprising:

operating the controller, the voltage tracker component, the clamp protection circuit, and the plurality of pullups consistent with ASIL B.

20. A method of assembling an electrical assembly including a controller, a clamp protection circuit coupled between a voltage tracker component and a plurality of analog inputs, and a plurality of pullups coupled between the plurality of analog inputs and the clamp protection circuit, the method comprising:

connecting a back-to-back circuit between the voltage tracker component and the clamp protection circuit to selectively connect the voltage tracker component;

connecting a first switch of the clamp protection circuit to a second switch of the clamp protection circuit;

connecting an input of the first switch to the plurality of analog inputs;

connecting an input of the second switch to an output of the first switch; and connecting an output of the second switch to a ground source; and wherein the clamp protection circuit controls the first switch to isolate the plurality of pullups from the controller and the back-to-back circuit controls the second switch to isolate the voltage tracker component from the clamp protection circuit.

\* \* \* \* \*